United States Patent
Lee (10) Patent No.: US 11,558,224 B2
(45) Date of Patent: Jan. 17, 2023

(54) METHOD FOR PRECODING TO MITIGATE NONLINEAR DISTORTIONS AND PRECODER FOR PERFORMING THE SAME

(71) Applicant: ELECTRONICS AND TELECOMMUNICATIONS RESEARCH INSTITUTE, Daejeon (KR)

(72) Inventor: Seung-Woo Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/519,445

(22) Filed: Nov. 4, 2021

(65) Prior Publication Data
US 2022/0303161 A1  Sep. 22, 2022

(30) Foreign Application Priority Data
Mar. 17, 2021  (KR) .......... 10-2021-0034676

(51) Int. Cl.
*H04L 25/03*  (2006.01)
(52) U.S. Cl.
CPC .............. *H04L 25/03159* (2013.01)
(58) Field of Classification Search
CPC ................................ H04L 25/03159
USPC ........................................... 375/230
See application file for complete search history.

(56) References Cited

U.S. PATENT DOCUMENTS

| | | | |
|---|---|---|---|
| 5,602,602 A * | 2/1997 | Hulyalkar | H04N 21/426 375/321 |
| 8,090,013 B2 | 1/2012 | Farhoodfar et al. | |
| 8,199,848 B2 | 6/2012 | Kwon et al. | |
| 8,340,171 B2 | 12/2012 | Hovakimyan et al. | |
| 2015/0341090 A1 | 11/2015 | Oh et al. | |

FOREIGN PATENT DOCUMENTS

| | | |
|---|---|---|
| KR | 10-0845498 B1 | 7/2008 |
| KR | 10-0913856 B1 | 8/2009 |

\* cited by examiner

*Primary Examiner* — Lihong Yu
(74) *Attorney, Agent, or Firm* — LRK Patent Law Firm (57) ABSTRACT

A method for precoding to mitigate nonlinear distortions and a precoder for performing the same are disclosed. The precoder for mitigating distortions of a communication signal may include a filter configured to generate a filtering signal based on a third signal and filter coefficients corresponding to a selected signal generated based on a first signal, a second signal, and the third signal, and a modulo operator configured to generate the third signal by performing a modulo operation on the second signal, wherein the second signal is generated based on the first signal and the filtering signal.

15 Claims, 6 Drawing Sheets

METHOD FOR PRECODING TO MITIGATE NONLINEAR DISTORTIONS AND PRECODER FOR PERFORMING THE SAME

CROSS-REFERENCE TO RELATED APPLICATION

This application claims the benefit of Korean Patent Application No. 10-2021-0034676 filed on Mar. 17, 2021, in the Korean Intellectual Property Office, the entire disclosure of which is incorporated herein by reference for all purposes.

BACKGROUND

1. Field of the Invention

One or more example embodiments relate to a precoding method for mitigating nonlinear distortions and a precoder for performing the same.

2. Description of Related Art

Recently, it has become necessary to implement low cost, small size short distance optical links used in massive constructions such as a data center, a metro network, an optical access network. In addition, as a modulation method, pulse amplitude modulation (PAM), one of the direct detection modulation methods, is being widely used. More particularly, PAM-4 has been adopted as a modulation method for IEEE 802.3bs, which is a 400 Gbps ethernet standard, in consideration of power consumption and implementation complexity.

In case of a direct detection method, interference between symbols such as inter-symbol interference (ISI) may occur due to a bandwidth limitation of an electronic device. In addition, since the optical devices being used are low cost, nonlinear distortion may occur. The distortion is an amplitude-dependent skew according to a level or an amplitude of a signal and an amplitude-dependent noise.

Conventionally, a pre-equalizer such as a Tomlinson-Harashima Precoder (THP) is used in a transmitter to reduce ISI generated due to a bandwidth limitation. This is a modified method of mitigating ISI by a feed-forward equalizer (FFE) in a receiver. In a conventional THP structure, a modulo operator is added to a FFE filter used in the receiver.

Since a conventional THP may remove post-cursor ISI based on a channel response characteristic of a channel, it may be used in a transmitter of a system with a small bandwidth capability. A filter used in a THP may be designed to have a linear characteristic and configured with same channel response characteristic regardless of a level of a signal as a filter. Thus, it may be difficult to solve the problem of linear distortions occurring at each level of the signal.

The above description has been possessed or acquired by the inventor(s) in the course of conceiving the present disclosure and is not necessarily an art publicly known before the present application is filed.

SUMMARY

Example embodiments provide a precoding method for mitigating nonlinear distortions of a signal as well as inter-symbol interference (ISI).

However, the technical aspects are not limited to the aforementioned aspects, and other technical aspects may be present.

According to an aspect, there is provided a precoder for mitigating distortions of a communication signal including a filter configured to generate a filtering signal based on a third signal and filter coefficients corresponding to a selected signal generated based on a first signal, a second signal, and the third signal, and a modulo operator configured to generate the third signal by performing a modulo operation on the second signal, wherein the second signal may be generated based on the first signal and the filtering signal.

The filter may include a level detector configured to generate the selected signal, a plurality of delay elements configured to output delayed signals by delaying the third signal, a plurality of selectors configured to select and output the filter coefficients based on the selected signal, a plurality of multipliers configured to multiply the third signal and the delayed signals by the filter coefficients, and an adder configured to output the filtering signal by adding multiplication results obtained by the plurality of multipliers.

The level detector may include an adder configured to generate a level signal based on the first to third signals and a comparator configured to output the selected signal based on the level signal and a plurality of comparison signals.

The plurality of delay elements may include a first delay element configured to output a first delayed signal by delaying the third signal and a second delay element configured to output a second delayed signal by delaying the first delayed signal.

The plurality of selectors may include a first selector configured to output a first filter coefficient corresponding to the third signal, a second selector configured to output a second filter coefficient corresponding to the first delayed signal, and a third selector configured to output a third filter coefficient corresponding to the second delayed signal.

According to an aspect, there is provided a precoder for mitigating distortions of a communication signal, including a filter configured to generate a filtering signal based on a third signal and filter coefficients respectively corresponding to a plurality of selected signals generated based on a first signal, a second signal, and the third signal, and a modulo operator configured to generate the third signal by performing a modulo operation on the second signal, wherein the second signal is generated based on the first signal and the filtering signal.

The filter may include a level detector configured to generate the plurality of selected signals, a plurality of delay elements configured to output delayed signals by delaying the third signal, a plurality of selectors configured to select and output the filter coefficients based on the plurality of selected signals respectively, a plurality of multipliers configured to multiply the third signal and the delayed signals by the filter coefficients, and an adder configured to output the filtering signal by adding multiplication results obtained by the plurality of multipliers.

The level detector may include an adder configured to generate a level signal based on the first to third signals, a plurality of delay elements configured to output delayed signals by delaying the level signal, and a plurality of comparators configured to output the plurality of selected signals based on the level signal and the delayed level signals respectively.

According to an aspect, there is provided a method for precoding to mitigate distortions of a communication signal, including generating a filtering signal based on a third signal and filter coefficients selected based on a selected signal generated based on a first signal, a second signal, and the third signal, and generating the third signal by performing a modulo operation on the second signal, wherein the second signal is generated based on the first signal and the filtering signal.

The generating of the filtering signal may include generating the selected signal; outputting delayed signals by delaying the third signal, selecting and outputting the filter coefficients based on the selected signal, multiplying the third signal and the delayed signals by the filter coefficients, and outputting the filtering signal by adding multiplication results.

The generating of the selected signal may include generating a level signal based on the first to third signals and outputting the selected signal based on the level signal and a plurality of comparison signals.

The outputting by delaying may include outputting a first delayed signal by delaying the third signal and outputting a second delayed signal by delaying the first delayed signal.

The selecting and outputting of the filter coefficients may include outputting a first filter coefficient corresponding to the third signal, outputting a second filter coefficient corresponding to the first delayed signal, and outputting a third filter coefficient corresponding to the second delayed signal.

The outputting of the filtering signal may include generating a plurality of selected signals, outputting the delayed signals by delaying the third signal, selecting and outputting the filter coefficients based on the plurality of selected signals respectively, multiplying the third signal and the delayed signal by the filter coefficients, and outputting the filtering signal by adding multiplication results.

The generating of the plurality of selected signals may include generating a level signal based on the first to third signals, outputting delayed level signals by delaying the level signal, and outputting the plurality of selected signals based on the level signal and the delayed level signals respectively.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like components and a repeated description related thereto will be omitted.

Figure 1:
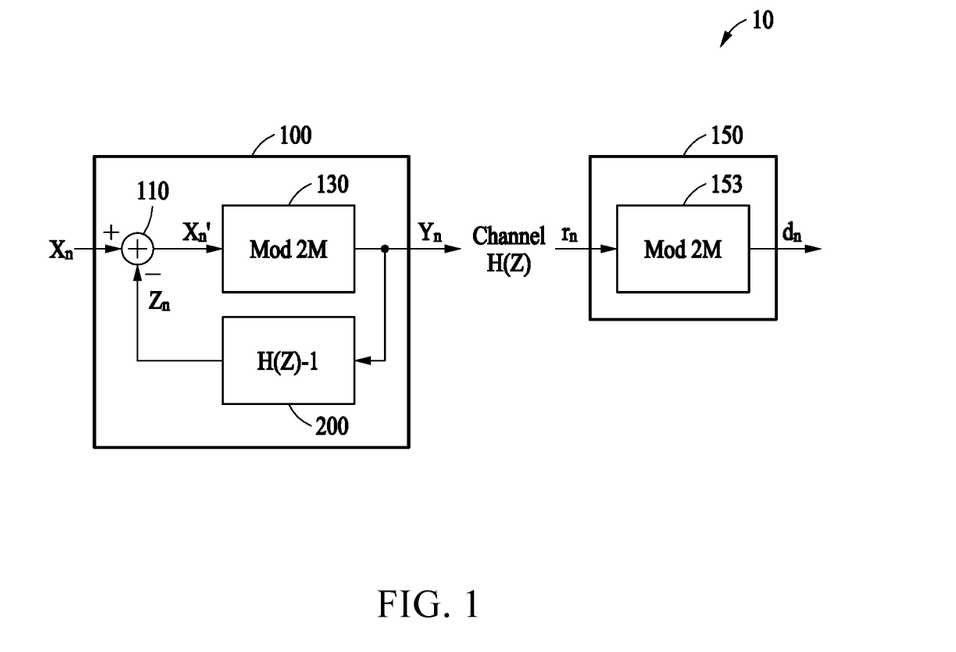
FIG. 1 illustrates a communication system according to an example embodiment.

FIG. 1 illustrates a communication system according to an example embodiment.

A communication system 10 may include a precoder 100 to mitigate a nonlinear distortion and inter-symbol interference (ISI) in a signal being transmitted and received. The precoder 100 may be implemented at a transmitter of the communication system 10. A demodulator may be implemented at a receiver corresponding to the precoder 100. FIG. 1 illustrates only a configuration to mitigate a nonlinear distortion and ISI in the communication system 10. Thus, it shall be understood that descriptions of general components of the communication system 10 are omitted.

The precoder 100 may remove the ISI occurring in the communication system 10 using an inverse function $H(Z)-1$ of a channel response $H(Z)$ through a filter 200. The precoder 100 may limit a maximum swing value transmitted for stabilizing the filter 200 to remove post-cursor ISI by performing a modulo operation Mod 2M by a modulo operator 130.

The precoder 100 may output a third signal $Y_n$ by performing precoding when a first signal $X_n$ is input. The filter 200 may generate a filtering signal $Z_n$ based on the third signal $Y_n$. A mixer 110 may generate a second signal $X_n'$ based on the first signal $X_n$ and the filtering signal $Z_n$. The second signal $X_n'$ may be a signal removing the filtering signal $Z_n$ from the first signal $X_n$. The modulo operator 130 may generate the third signal $Y_n$ by performing a modulo operation on the second signal $X_n'$. The third signal $Y_n$ may be a signal transmitted to the receiver.

The demodulator 150 may restore a received signal $r_n$ received from the receiver. The received signal $r_n$ may be a signal including noise when passing through a channel. A modulo operator 153 may restore the received signal $r_n$ by performing the modulo operation Mod 2M on the received signal $r_n$.

The precoder 100 may mitigate a nonlinear distortion occurring in the communication system 10 by selecting filter coefficients having nonlinear characteristics based on a level of a signal. The filter 200 may compensate for the nonlinear distortion by selecting the filter coefficients to generate the filtering signal $Z_n$ based on the first signal $X_n$, the second signal $X_n'$ and the third signal $Y_n$.

Figure 2:
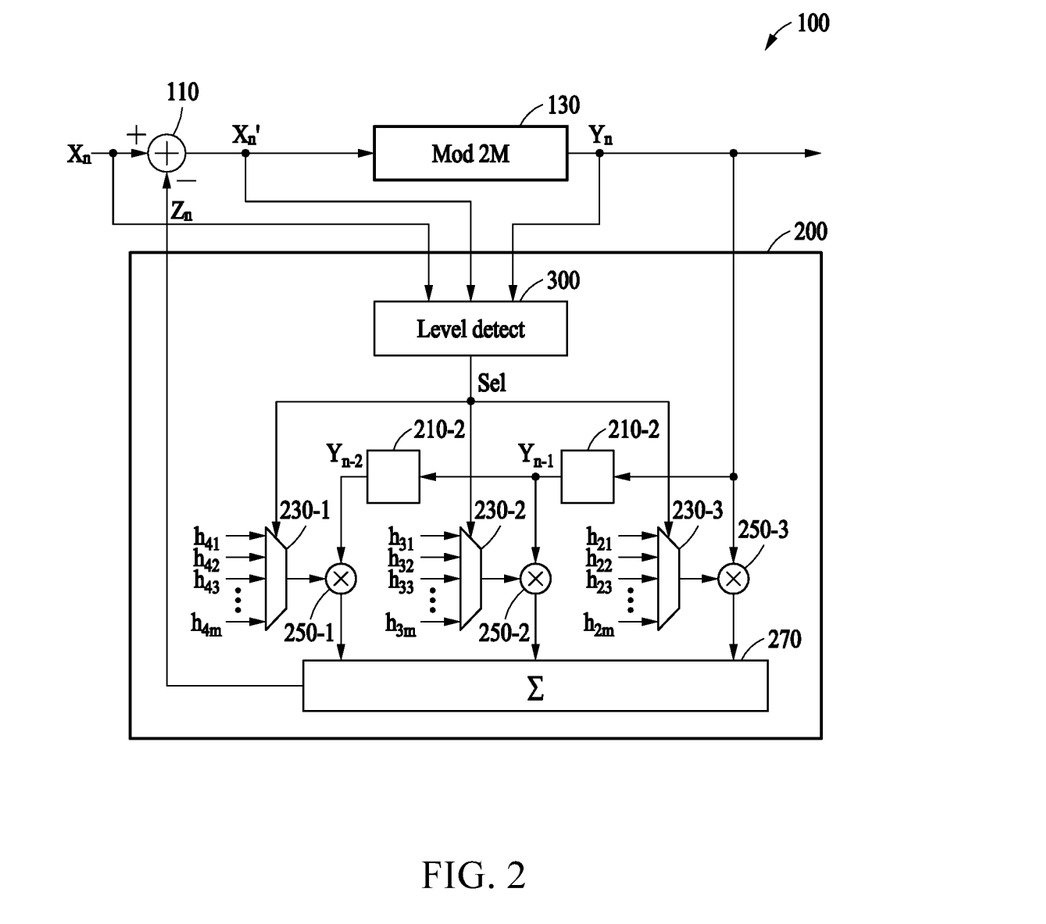
FIG. 2 illustrates an example of the precoder of FIG. 1.

FIG. 2 illustrates an example of the precoder of FIG. 1.

The precoder 100 may include the modulo operator 130 and the filter 200. The filter 200 may include a level detector 300, a plurality of delay elements 210-1 and 210-2, a plurality of selectors 230-1 to 230-3, a plurality of multipliers 250-1 to 250-3, and an adder 270.

The level detector 300 may generate a selected signal Sel based on the first signal $X_n$, the second signal $X_n'$, and the third signal $Y_n$. The level detector 300 may generate a level signal $L_n$ based on the first signal $X_n$, the second signal $X_n'$ and the third signal $Y_n$ and may output the selected signal Sel based on a level value of the level signal $L_n$. For example, the selected signal Sel may have a value of 1 to m (m is a natural number) according to a level value of the level signal $L_n$.

The selectors 230-1 to 230-3 may output filter coefficients based on the selected signal Sel. For example, the selectors 230-1 to 230-3 may output filter coefficients corresponding to the selected signal Sel among a plurality of filtering signals $h_{41}$ to $h_{4m}$, $h_{31}$ to $h_{3m}$, and $h_{21}$ to $h_{2m}$. For example, when the selected signal Sel is k (k is a natural number greater than or equal to 1 and less than or equal to m), the selectors 230-1 to 230-3 may output the filter coefficients $h_{4k}$, $h_{3k}$, and $h_{2k}$ respectively.

The delay elements 210-1 and 210-2 may output delayed signals by delaying the third signal $Y_n$. For example, the first delay element 210-1 may output a first delayed signal $Y_{n-1}$ by delaying the third signal $Y_n$ by a unit of time and the second delay element 210-2 may output a second delayed signal $Y_{n-2}$ by delaying the first delayed signal $Y_{n-1}$ by a unit of time. That is, the second delayed signal $Y_{n-2}$ may be an output signal of the third signal $Y_n$ delayed by two units of time.

The multipliers 250-1 to 250-3 may multiply the third signal $Y_n$, the first delayed signal $Y_{n-1}$ and the second delayed signal $Y_{n-2}$ by the filter coefficient and may output multiplication results. For example, the first multiplier 250-1 may multiply the second delayed signal $Y_{n-2}$ by the filter coefficient output from the first selector 230-1 and may output a multiplication result, the second multiplier 250-2 may multiply the first delayed signal $Y_{n-1}$ by the filter coefficient output from the second selector 230-2 and may output a multiplication result, and the third multiplier 250-3 may multiply the third signal $Y_n$ by the filter coefficient output from the third selector 230-3 and may output a multiplication result.

The adder 270 may add the multiplication results obtained by the multipliers 250-1 to 250-3 and output the filtering signal $Z_n$. For example, the adder 270 may output the filtering signal $Z_n$ by adding all multiplication results output from the first multiplier 250-1 to the third multiplier 250-3 respectively. For example, when the selected signal Sel is k so that filter coefficients output from the selectors 230-1 to 230-3 are the filter coefficient $h_{4k}$, $h_{3k}$, and $h_{2k}$ respectively, the filtering signal $Z_n$ may be expressed by Equation 1.

$$Z_n = h_{2k}Y_n + h_{3k}Y_{n-1} + h_{4k}Y_{n-2}$$ [Equation 1]

Figure 3:
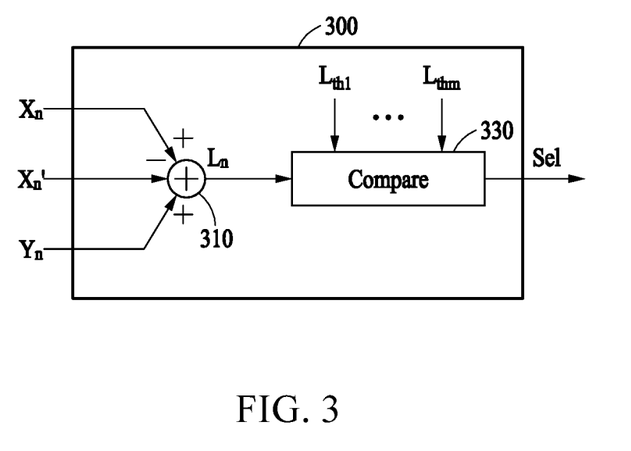
FIG. 3 illustrates the level detector of FIG. 2.

FIG. 3 illustrates the level detector of FIG. 2.

The level detector 300 may include an adder 310 to generate a level signal $L_n$ based on a first signal $X_n$, a second signal $X_n'$, and a third signal $Y_n$ and a comparator 330 to output the selected signal Sel based on the level signal $L_n$ and a plurality of comparison signals $L_{th1}$ to $L_{thm}$.

The level signal $L_n$ output from the adder 310 may be expressed by Equation 2.

$$L_n = X_n - X_n' + Y_n$$ [Equation 2]

The comparator 330 may determine which comparison signal among the plurality of comparison signals $L_{th1}$ to $L_{thm}$ has a same level value as the level signal $L_n$. For example, when a difference of level values between the level signal $L_n$ and a comparison signal $Lt_{hk}$ is less than or equal to a threshold value, the comparator 330 may determine that the level signal $L_n$ has a same level value as the comparison signal $L_{thk}$.

The comparator 330 may output the selected signal Sel corresponding to the comparison signal $Lt_{hk}$ which is determined to have a same level value as the level signal $L_n$. For example, the comparator 330 may output k as the selected signal Sel corresponding to the comparison signal $L_{thk}$ having a same level value as the level signal $L_n$.

Figure 6A:
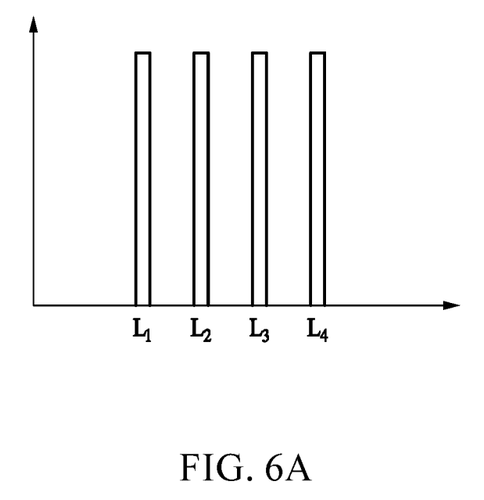
FIGS. 6A and 6B illustrates a level signal of a level detector and a comparison signal of a level detector respectively.
Figure 6B:
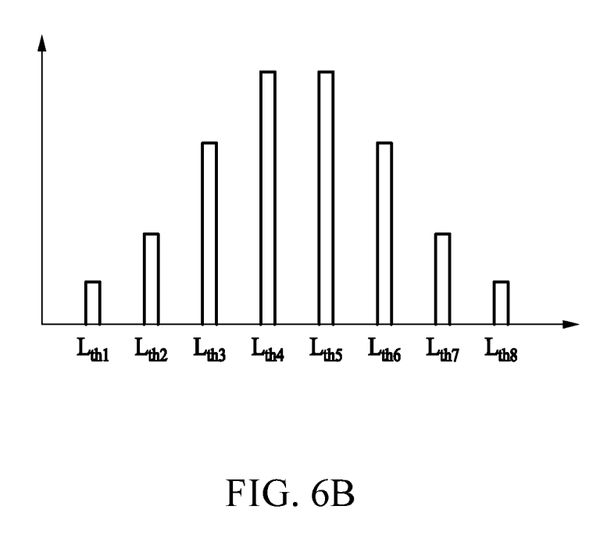

When the first signal $X_n$ is a pulse amplitude modulation-4 (PAM-4) signal, the level signal $L_n$ may include four signal levels as shown in FIG. 6A. The plurality of comparison signals $Lt_{h1}$ to $L_{thm}$ may correspond to six signal levels as shown in FIG. 6B, and in this case, the selected signal Sel may be output as any one of 1 to 6.

Figure 4:
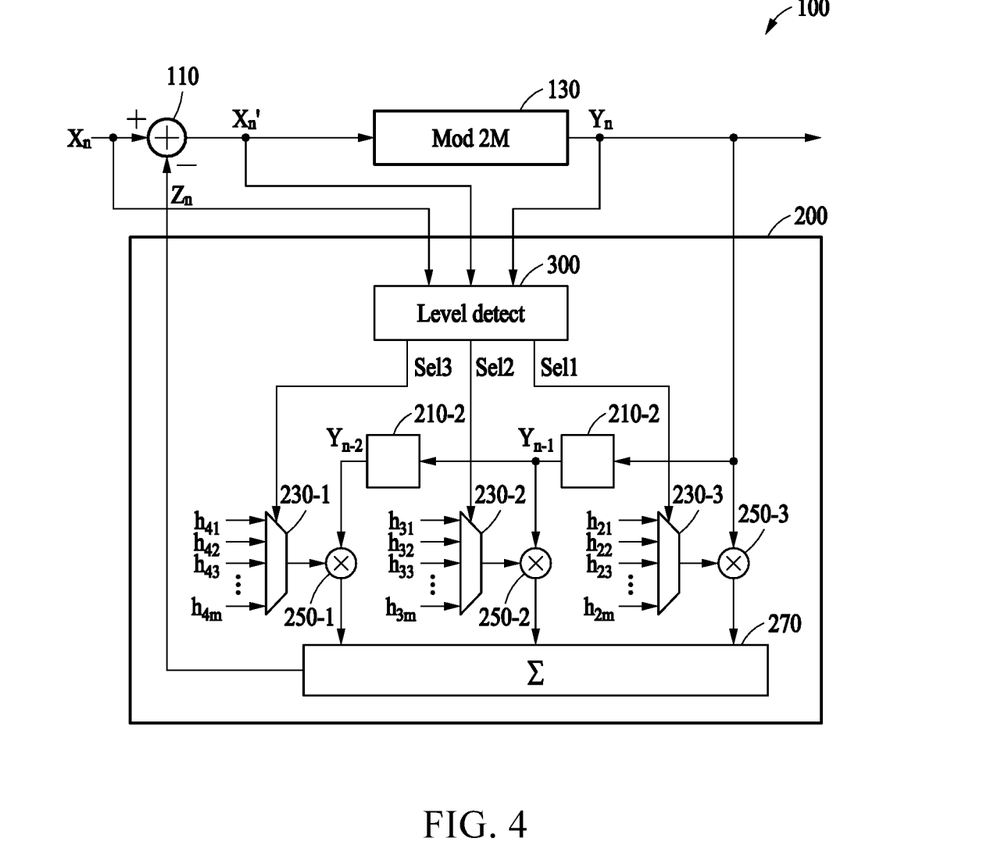
FIG. 4 illustrates another example of the precoder of FIG. 1.
Figure 5:
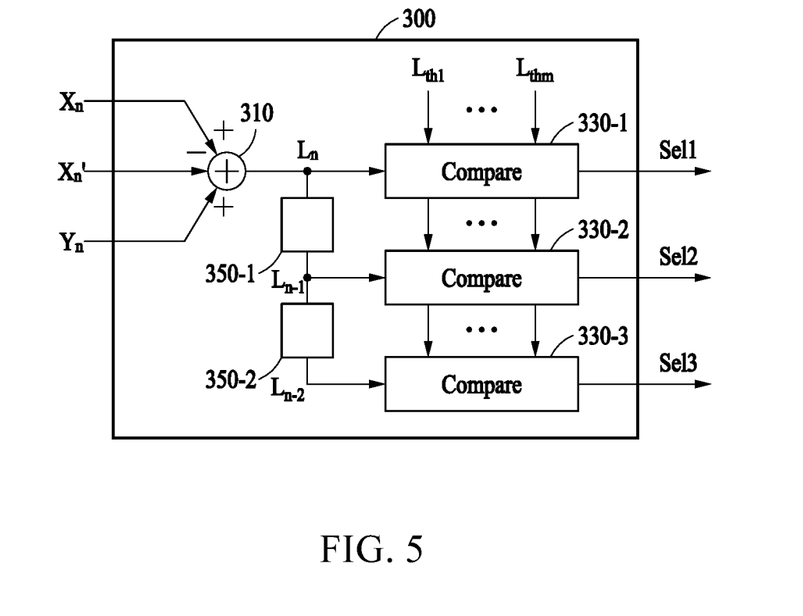
FIG. 5 illustrates the level detector of FIG. 4.

FIG. 4 illustrates another example of the precoder of FIG. 1 and FIG. 5 illustrates the level detector of FIG. 4.

The precoder 100 may include the filter 200 to generate the filtering signal $Z_n$ using three selected signals Sel1 to Sel3. Since the precoder 100 of FIG. 4 may be same as the precoder 100 of FIG. 2 except for the level detector 300, a duplicate description of the configuration to perform the same operation is omitted.

The level detector 300 may further include a plurality of delay elements 350-1 and 350-2. The delay elements 350-1 and 350-2 may output delayed signals by delaying the level signal $L_n$ output from the adder 310. For example, the first delay element 350-1 may output a first delayed level signal $L_{n-1}$ by delaying the level signal $L_n$ by a unit of time and the second delay element 350-2 may output a second level signal $L_{n-2}$ by delaying the first delayed level signal $L_{n-1}$ by a unit of time. That is, the second delayed level signal $L_{n-2}$ may be a delayed signal of the level signal $L_n$ by two units of time.

The level detector 300 may further include a plurality of comparators 330-1 to 330-3. The respective comparators 330-1 to 330-3 may perform the same operation as the comparator 330 of FIG. 3. For example, the comparators 330-1 to 330-3 may output the first selected signal Sel1, the second selected signal Sel2, and the third selected signal Sel3 respectively based on the level signal $L_n$, the first delayed level signal $L_{n-1}$, and the second delayed level signal $L_{n-2}$.

The first selected signal Sel1, the second selected signal Sel2, and the third selected signal Sel3 may be input to the corresponding selectors 230-1 to 230-3. That is, since the selected signals Sel1 to Sel3 different from each other may be input to each of the selectors 230-1 to 230-3, the selectors 230-1 to 230-3 may output filter coefficients different from each other and the filtering signal $Z_n$ may be generated based on the different filter coefficients. For example, when the selected signals Sel1 to Sel3 are p, q, and r (p, q, and r are natural numbers greater than or equal to 1 and less than or equal to m) respectively, the filtering signal $Z_n$ may be expressed by Equation 3.

$$Z_n = h_{2p}Y_n + h_{3q}Y_{n-1} + h_{4r}Y_{n-2} \qquad \text{[Equation 3]}$$

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The examples described herein may be implemented using hardware components, software components and/or combinations thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A precoder for mitigating distortions of a communication signal, the precoder implemented at a transmitter and comprising:
    a filter configured to generate a filtering signal based on a third signal and filter coefficients corresponding to a selected signal generated based on a first signal, a second signal, and the third signal, wherein the filter coefficients have nonlinear characteristics and are selected such that the filter compensates for nonlinear distortions; and
    a modulo operator configured to generate the third signal by performing a modulo operation on the second signal,
    wherein the second signal is generated based on the first signal and the filtering signal.

2. The precoder of claim 1, wherein the filter comprises:
    a level detector configured to generate the selected signal;
    a plurality of delay elements configured to output delayed signals by delaying the third signal;
    a plurality of selectors configured to select and output the filter coefficients based on the selected signal;
    a plurality of multipliers configured to multiply the third signal and the delayed signals by the filter coefficients; and
    an adder configured to output the filtering signal by adding multiplication results obtained by the plurality of multipliers.

3. The precoder of claim 2, wherein the level detector comprises:
    an adder configured to generate a level signal based on the first to third signals; and
    a comparator configured to output the selected signal based on the level signal and a plurality of comparison signals.

4. The precoder of claim 2, wherein the plurality of delay elements comprises:
    a first delay element configured to output a first delayed signal by delaying the third signal; and
    a second delay element configured to output a second delayed signal by delaying the first delayed signal.

5. The precoder of claim 4, wherein the plurality of selectors comprises:
a first selector configured to output a first filter coefficient corresponding to, the third signal;
a second selector configured to output a second filter coefficient corresponding to the first delayed signal; and
a third selector configured to output a third filter coefficient corresponding to the second delayed signal.

6. A precoder for mitigating distortions of a communication signal, the precoder implemented at a transmitter and comprising:
a filter configured to generate a filtering signal based on a third signal and filter coefficients respectively corresponding to a plurality of selected signals generated based on a first signal, a second signal, and the third signal, wherein the filter coefficients have nonlinear characteristics and are selected such that the filter compensates for nonlinear distortions; and
a modulo operator configured to generate the third signal by performing a modulo operation on the second signal,
wherein the second signal is generated based on the first signal and the filtering signal.

7. The precoder of claim 6, wherein the filter comprises:
a level detector configured to generate the plurality of selected signals;
a plurality of delay elements configured to output delayed signals by delaying the third signal;
a plurality of selectors configured to select and output the filter coefficients based on the plurality of selected signals respectively;
a plurality of multipliers configured to multiply the third signal and the delayed signals by the filter coefficients; and
an adder configured to output the filtering signal by adding multiplication results obtained by the plurality of multipliers.

8. The precoder of claim 7, wherein the level detector comprises:
an adder configured to generate a level signal based on the first to third signals;
a plurality of delay elements configured to output delayed signals by delaying the level signal; and
a plurality of comparators configured to output the plurality of selected signals based on the level signal and the delayed level signals respectively.

9. A method for precoding to mitigate distortions of a communication signal, the method performed at a transmitter and comprising:
generating a filtering based on a third signal and filter coefficients selected based on a selected signal generated based on a first signal, a second signal, and the third signal, wherein the filter coefficients have nonlinear characteristics and are selected so as to compensate for nonlinear distortions; and
generating the third signal by performing a modulo operation on the second signal,
wherein the second signal is generated based on the first signal and the filtering signal.

10. The method of claim 9, wherein the generating of the filtering signal comprises:
generating the selected signal;
outputting delayed signals by delaying the third signal;
selecting and, outputting the filter coefficients based on the selected signal;
multiplying the third signal and the delayed signals by the filter coefficients; and
outputting the filtering signal by adding multiplication results.

11. The method of claim 10, wherein the generating of the selected signal comprises:
generating a level signal based on the first to third signals; and
outputting the selected signal based on the level signal and a plurality of comparison signals.

12. The method of claim 10, wherein the outputting by delaying comprises:
outputting a first delayed signal by delaying the third signal; and
outputting a second delayed signal by delaying the first delayed signal.

13. The method of claim 12, wherein the selecting and outputting of the filter coefficients comprises:
outputting a first filter coefficient corresponding to the third signal;
outputting a second filter coefficient corresponding to the first delayed signal; and
outputting a third filter coefficient corresponding to the second delayed signal.

14. The method of claim 9, wherein the outputting of the filtering signal comprises:
generating a plurality of selected signals;
outputting the delayed signals by delaying the third signal;
selecting and outputting the filter coefficients based on the plurality of selected signals respectively;
multiplying the third signal and the delayed signal by the filter coefficients; and
outputting the filtering signal by adding multiplication results.

15. The method of claim 14, wherein the generating of the plurality of selected signals comprises:
generating a level signal based on the first to third signals;
outputting delayed level signals by delaying the level signal; and
outputting the plurality of selected signals based on the level signal and the delayed level signals respectively.

* * * * *